United States Patent [19]

Griffing et al.

[11] 4,215,577

[45] Aug. 5, 1980

[54] UTILIZATION OF DIODES AS WIDE RANGE RESPONSIVE THERMOMETERS

[75] Inventors: Bruce F. Griffing, Lafayette; Srinivasarao A. Shivashankar, West Lafayette, Ind.

[73] Assignee: Purdue Research Foundation, West Lafayette, Ind.

[21] Appl. No.: 937,196

[22] Filed: Aug. 28, 1978

[51] Int. Cl.³ ............................................. G01K 7/18
[52] U.S. Cl. ........................... 73/362 SC; 338/22 SD; 357/28; 357/80
[58] Field of Search ............... 73/362 SC; 338/22 SD; 357/28, 80

[56] References Cited

U.S. PATENT DOCUMENTS

| | | | |
|---|---|---|---|
| 2,691,577 | 10/1954 | Horovitz et al. | 338/22 SD |
| 3,092,998 | 6/1963 | Barton | 73/362 |
| 3,142,987 | 8/1964 | Dowling | 73/362 SC |
| 3,274,456 | 9/1966 | Pittler | 357/80 |

Primary Examiner—S. Clement Swisher
Attorney, Agent, or Firm—John R. Nesbitt

[57] ABSTRACT

A device is disclosed, and a method for construction, in which gallium arsenide phosphide diode chips are employed to produce an inexpensive thermometer that has a broad range, accurate, temperature sensitivity. The thermometer does not require recalibration to maintain accuracy and is rugged in construction. The chip described is a type commonly found in light-emitting diodes.

1 Claim, 4 Drawing Figures

UTILIZATION OF DIODES AS WIDE RANGE RESPONSIVE THERMOMETERS

The Government has rights in this invention pursuant to Grant No. DMR71-01821 A01 awarded by the National Science Foundation.

FIELD OF THE INVENTION

This invention relates to electric thermometers, and, more particularly, to devices that employ semiconductors for temperature sensing.

BACKGROUND OF THE INVENTION

Solid state diodes have been used as temperature sensors in the past. For example, transistors are used to sense temperatures in U.S. Pat. No. 4,071,813 and a thermal diode is described in U.S. Pat. No. 3,996,451.

More specifically, for temperature sensing, a field effect transistor is described in U.S. Pat. No. 3,801,949, a Schottsky barrier diode is used in U.S. Pat. No. 3,719,797, a silicon germanium sensor is described in U.S. Pat. No. 4,035,757, a monolithic semiconductor is used in U.S. Pat. No. 4,050,083, and an opposed pole Zener diode is described in U.S. Pat. No. 4,090,151.

All of the temperature sensors suffer from deficiencies of one kind or another when one attempts to utilize them over a wide temperature range, such as between 1.5° K.–400° K.

The most commonly commercially available solid state diode used for temperature sensing is one which includes gallium arsenide. Even when purchased in commercial quantities, these diodes cost as much as $100 each. But aside from cost, when used in a low temperature application, for example, on the order of 1.5° K.–30° K. where much cryogenic work is done, the response time for these diodes, and their sensitivity, due to their inherent method of construction, and because of their mass, is not as good as could be desired, and also when significant magnetic fields are impressed upon the low temperature environment being sensed (which is often the case in cryogenic research) many of the diodes mentioned above have problems with accuracy, and they also can be thrown out of calibration.

SUMMARY OF THE INVENTION

This invention provides apparatus and a device for utilizing gallium arsenide phosphide diode chips as temperature sensors, and this is accomplished by utilizing the nearly linear response curve of a specially mounted semiconductor chip, as hereinafter described, over a temperature range of from about 4° K. to about 400° K.

It is therefore an object of this invention to provide an improved method for construction of a solid state temperature sensing device.

It is another object of this invention to provide an improved device which utilizes readily available diode chips (of the type commonly used in light emitting diodes) to provide an accurate, wide range, temperature sensing device.

It is still another object of this invention to provide a thermometer that is particularly well suited for accurate operation with low temperature operation in the range of about 4° K. to 30° K.

It is yet another object of this invention to provide an improved thermometer that does not provide inaccurate results during cryogenic use, even when significant electromagnetic fields have been impressed upon the location where the temperature was being sensed.

With these and other objects in view, which will become apparent to one skilled in the art as the description proceeds, this invention resides in the novel construction, combination and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best modes so far devised for the practical application of the principles thereof, and in which.

DESCRIPTION OF THE INVENTION

Figure 1:
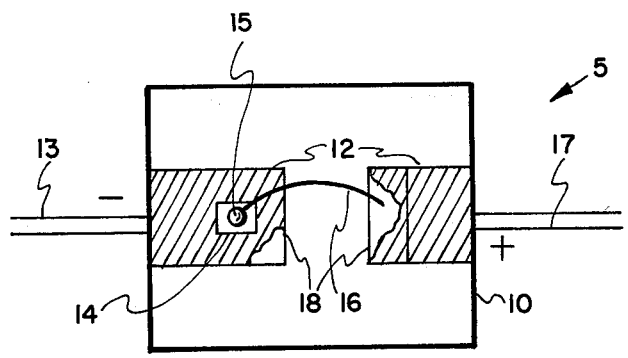
FIG. 1 is a stylized top view of a diode constructed according to the present invention.

The configuration of the temperature sensing diode of the present invention is shown generally as element 5 in FIG. 1. A substrate 10, preferably of sapphire, has a nichrome film (not shown) applied to the surface area where gold film 18 is to be applied. Gold film 18 is deposited on said substrate 10 on top of the nichrome film, and then indium solder pads 12 are bonded to the gold. A chip 14 of a type commonly used in light emitting diodes (namely a chip of gallium arsenide phosphide) is soldered with indium to one indium pad 12. The chip 14 has a nipple 15 to which a lead wire 16 of aluminum or gold is soldered, and then said lead wire is soldered to the other indium pad 12, which provides a cathode which includes chip 14 having external lead 13, and an anode having an external lead 17.

Figure 2:
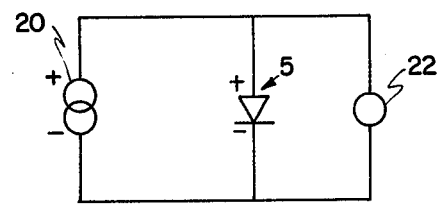
FIG. 2 is a circuit diagram showing the use of the diode of FIG. 1.

FIG. 2 illustrates a typical circuit which would include the diode described, said diode 5 being connected between a constant current source 20 (typically on the order of 10μA) and a load which consists of a high impedance voltage measuring device 22.

Figure 3:
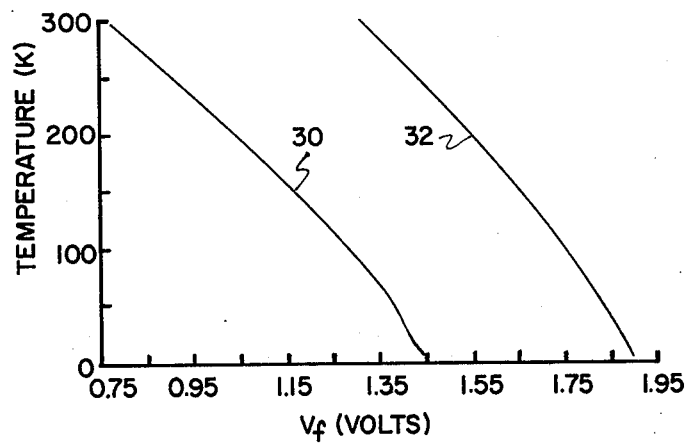
FIG. 3 is a graph illustrating the performance curve for a standard gallium arsenide diode and for the gallium arsenide phosphide chip of the present invention, the curves being plotted as a function of diode voltage output ($V_f$ as a function of temperature K.).

FIG. 3 shows the operating characteristics of a typical commercially available temperature sensing diode at 30 (shown in FIG. 4 and hereafter described) and of a typical diode constructed according to the present invention at 32. It is important that the curve have a significant slope and also that it be as nearly linear as possible, so that the voltage output of the circuit shown in FIG. 2 will be easily calibrated to a desired temperature readout. It should be noted that, while the device shown in FIG. 4 has good sensitivity over a broad range, the slope of its performance curve in the sub 30° K. range tends to diminish compared to the slope of the present invention. Some of the other patented solid state devices described above probably also suffer from this same reduced slope at either one end or the other of the typical operating range of the present device as shown in FIG. 3, from about 4° K. to about 300° K.

Figure 4:
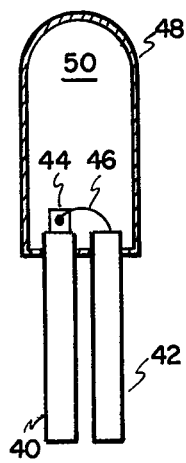
FIG. 4 is a stylized side view of a commercially available solid state device employing the standard gallium arsenide diode chip.

The temperature sensor shown in FIG. 4 is composed of a cathode 40 and an anode 42, typically made of platinum or other good conductor, and the cathode has a gallium arsenide chip 44 bonded in a standard manner to it, and the gold wire 46 connects the chip to the anode. A metal case 48 is sealed around the cathode and anode and the envelope 48 is filled with helium 50. The helium is employed to establish good heat transfer (by convection) between the metal case 48 (which is the portion of the device that contacts the point at which the temperature is being sensed) and the chip where the voltage output that developes the curve 30 (shown in FIG. 3) is originated. The time response of the current art device shown in FIG. 4 is not good due to its relatively large mass.

At a constant excitation current of 10μA the forward voltage in diode 5 changes from about 1.3 V at 300° K. to about 1.9 V at 4.2° K. This allows one to exploit the full resolution of a 4½ or 5½-digit voltmeter (19999 and 199999 counts, respectively). In order to reduce the thermal response time, the thermal mass of the diode is reduced in as much as the sapphire substrate 10 directly contacts the point where temperature is sensed, and the mass of both the metal case 48 and helium 50 of the device of FIG. 4 is eliminated.

In construction, chip 14 is mounted (by indium soldering) on a thin sapphire plate 10 which serves as the sample holder in a microcalorimeter (not shown). Calibration was performed against a standardized GaAs diode (of the type shown in FIG. 4) which was mounted on the other side of the sapphire plate, using a thin coating of varnish. Temperature regulation in the cryostat was achieved with a PAR-152 temperature controller. The diode voltage signals were measured on a DANA 5000 digital voltmeter 22 capable of resolving 10μV in 2 V, equivalent to a temperature resolution of 1/100 degree in the region 4.2°–20° K. Due to inherent noise of the diode, the actual temperature resolution is somewhat lower.

FIG. 2 shows the V-T characteristic of the present diode and provides a comparison with the commercial GaAs sensor as illustrated in FIG. 4.

Table 1 illustrates the variation in the sensitivity of the present invention over different temperature ranges:

TABLE 1

SENSITIVITY OF THE PRESENT DIODE OF THIS INVENTION OVER DIFFERENT TEMPERATURE RANGES

| Temp. range (K) | Avg.$\Delta V_f/\Delta T$ (mV/K) |
| --- | --- |
| 4.2–10 | −1.15 |
| 10–40 | −1.35 |
| 40–60 | −1.55 |
| 60–100 | −1.85 |
| 100–200 | −2.05 |
| 200–250 | −2.30 |
| 250–300 | −2.50 |

Experiments show that these diodes may be used up to approximately 400° K.

Within the accuracy of the measurements, no change or shift in the V-T characteristic of the diode was observed, even after many thermal cyclings. The V-T curve is nearly linear over most of the temperature range. Through careful selection it is possible to pick a diode that exhibits better sensitivity at low temperatures than do commercial GaAs sensors, and this characteristic may be observed by comparing the slopes of the respective curves shown in FIG. 3. Silicon diodes are more sensitive temperature sensors than those of the present invention, particularly at temperatures below 25° K., but their use is somewhat constrained by their relatively high cost and by the large forward voltage (>2 V) in the temperature range below 10° K. If one employs a five-digit voltmeter with 100% overrange, as is common practice, one cannot exploit the full sensitivity of the instrument in the low-temperature region.

As can be appreciated from the foregoing, this invention provides an improved temperature sensing device, and method for construction of same, and obvious modifications of the mode of construction are included in the scope of the appended claims.

What is claimed is:

1. A temperature sensing diode comprised of:
   an efficient heat conducting substrate with good electrical insulating capacity;
   a metal cathode secured to said substrate, said metal being selected so that it does not develop differential stresses in an operative range between about 1.9° K. to about 400° K.,
   a semi-conductor chip made of gallium arsenide phosphide having light emission characteristics of an electroluminescent diode suitable for use as a temperature sensor, said chip being secured to said metal cathode;
   a metal anode secured to said substrate, said metal being selected so that it does not develop differential stresses in said operative range;
   an electrical conductor connecting said cathode and anode; and
   external input and output connector terminals located, respectively, on said cathode and anode.

* * * * *